June 1, 1937.   I. N. ODELL   2,082,257
FILM HOLDER
Filed March 16, 1936    8 Sheets-Sheet 1
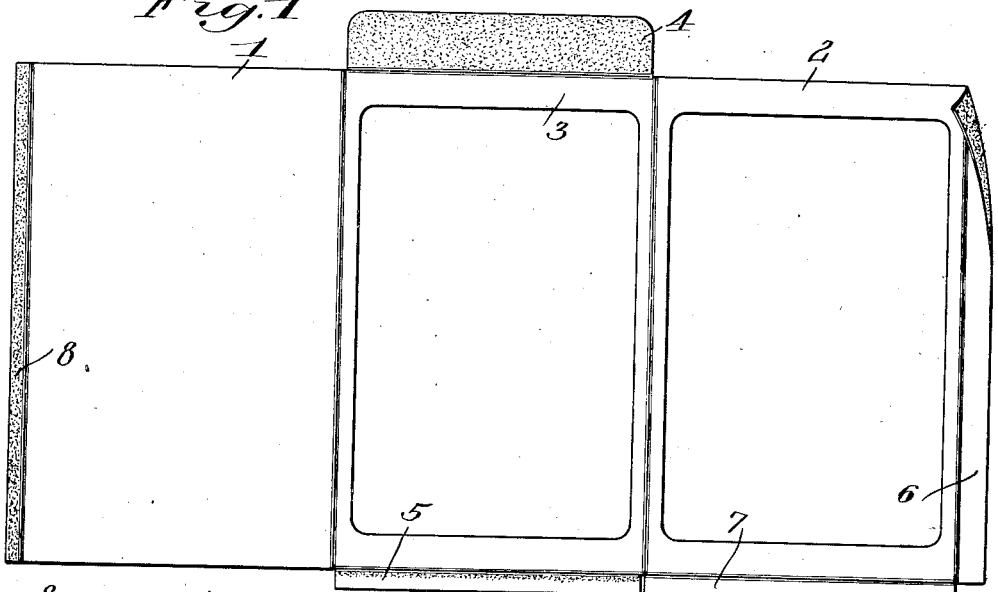
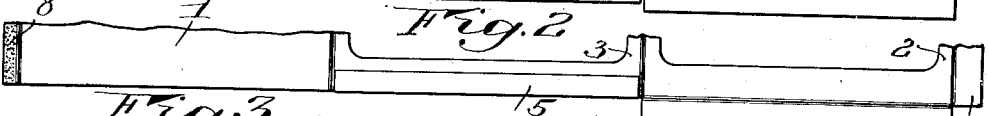
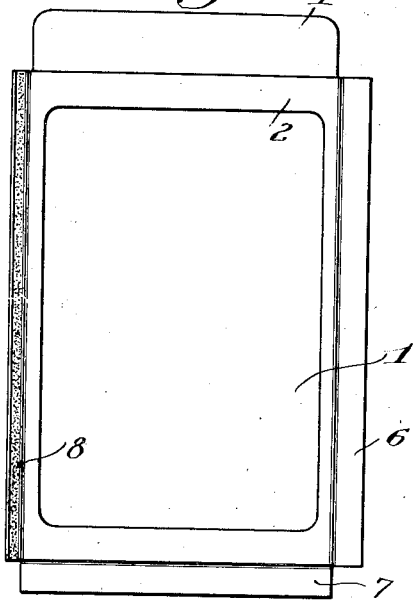
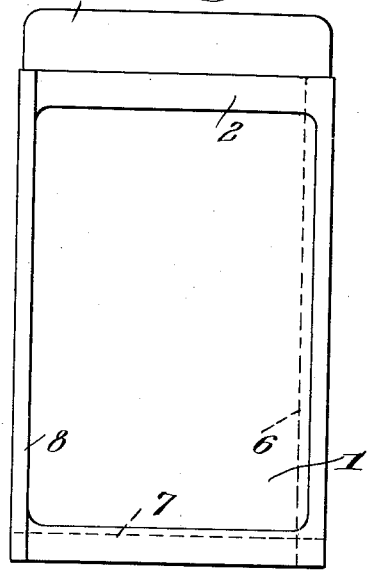
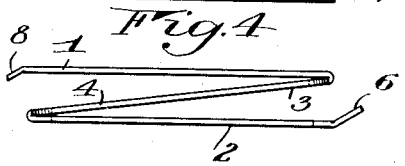
INVENTOR.
Isaac N. Odell
BY Harold E. Stonebraker
his ATTORNEY.

June 1, 1937. I. N. ODELL 2,082,257
FILM HOLDER
Filed March 16, 1936 8 Sheets-Sheet 2
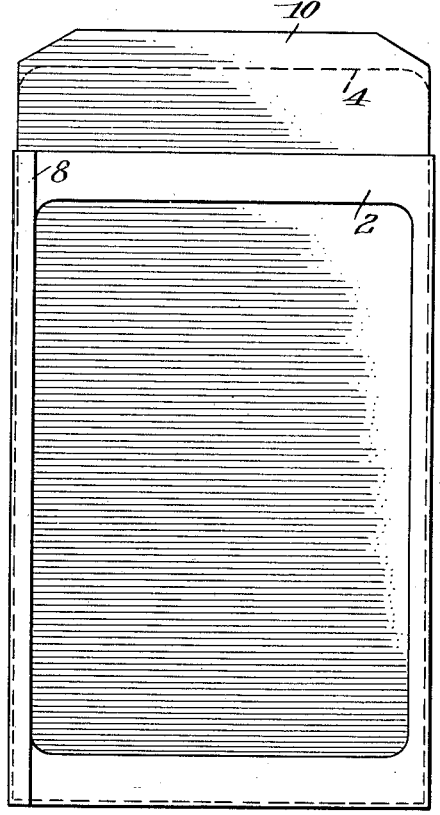
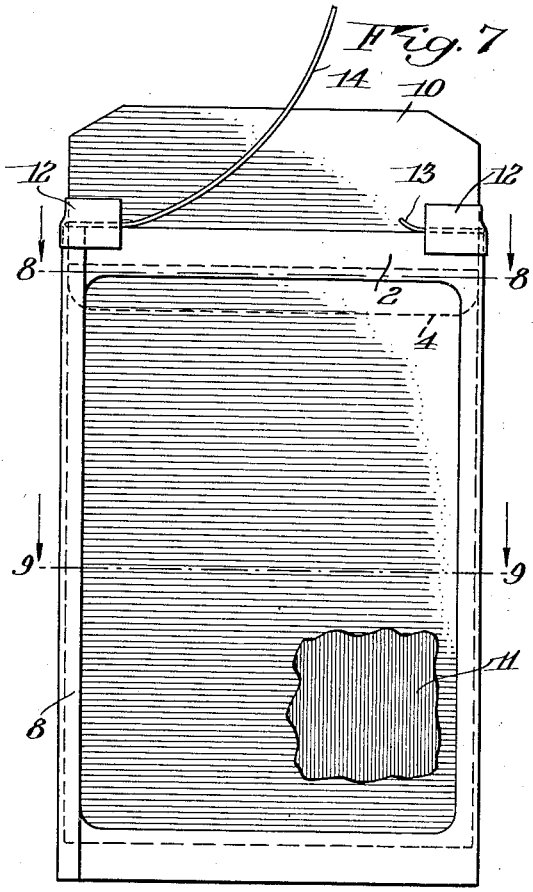
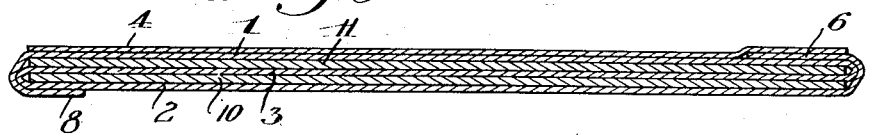
INVENTOR.
Isaac N. Odell
BY Harold E. Stonebraker
his ATTORNEY.

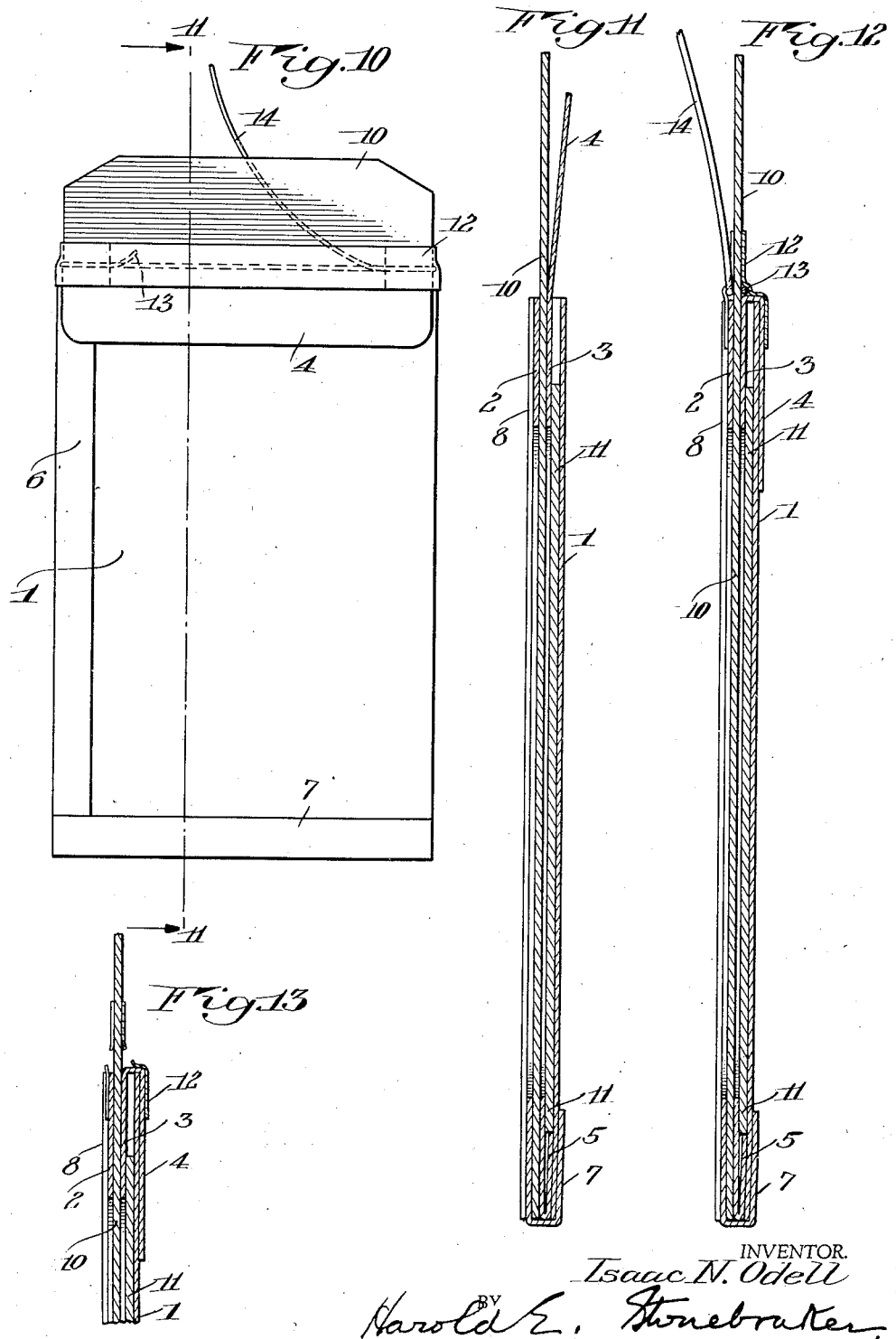

June 1, 1937. I. N. ODELL 2,082,257
FILM HOLDER
Filed March 16, 1936 8 Sheets-Sheet 4
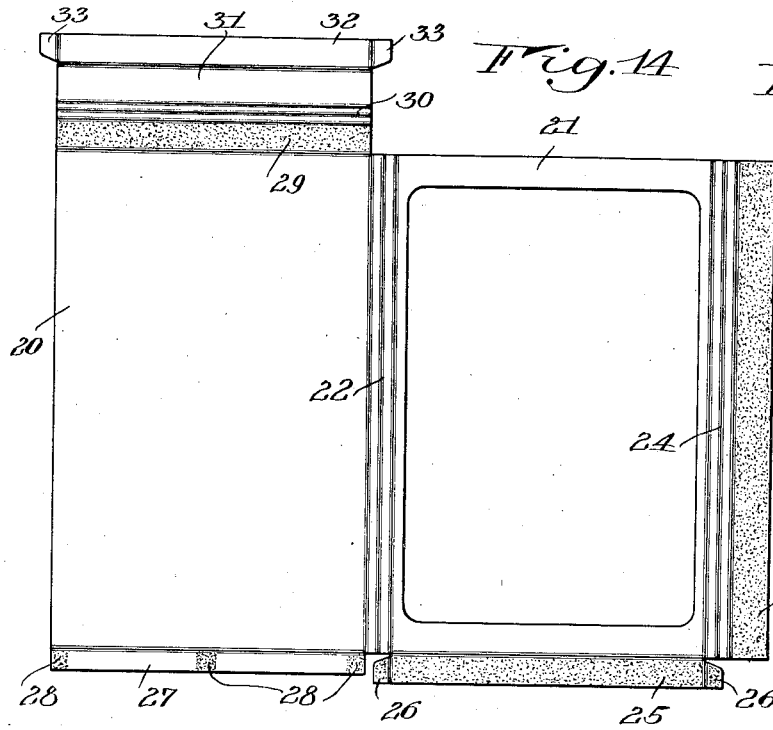
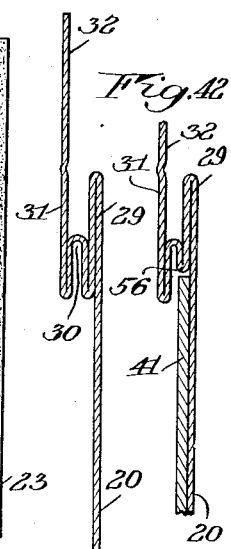
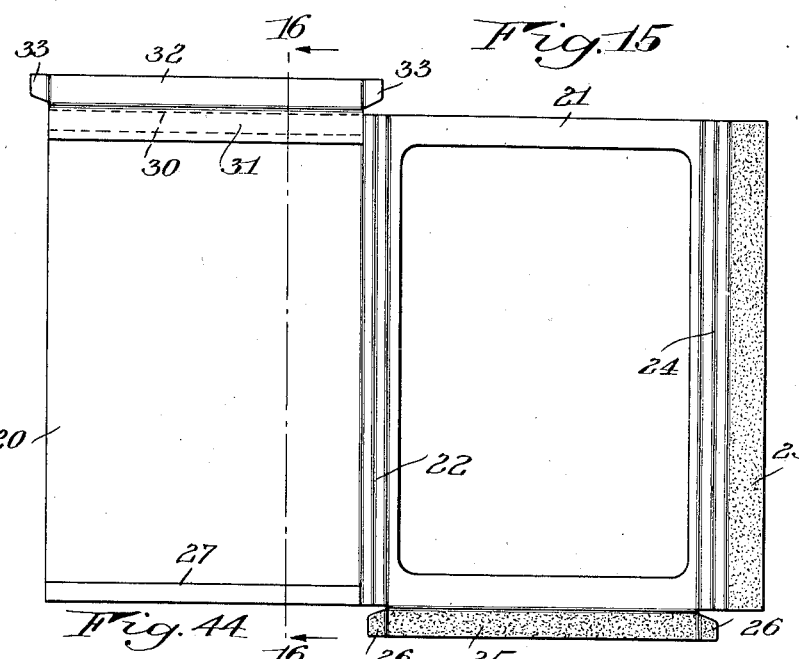
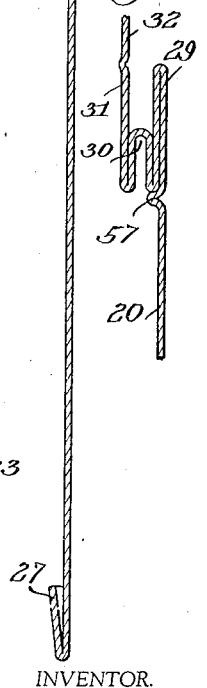
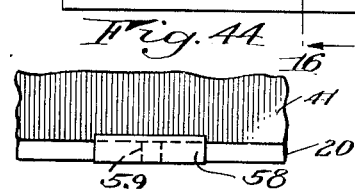
INVENTOR.
Isaac N. Odell
BY Harold E. Stonebraker,
his ATTORNEY.

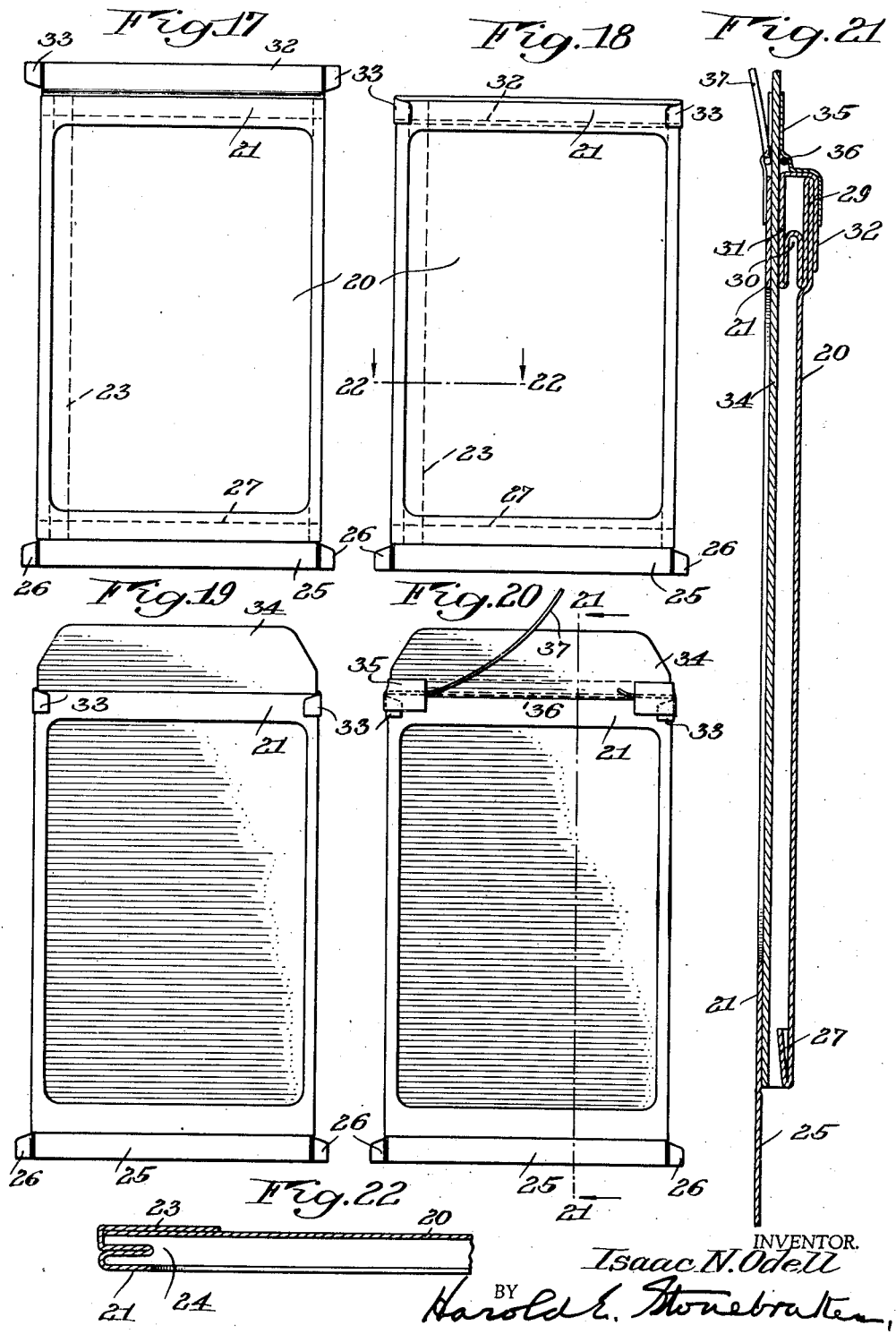

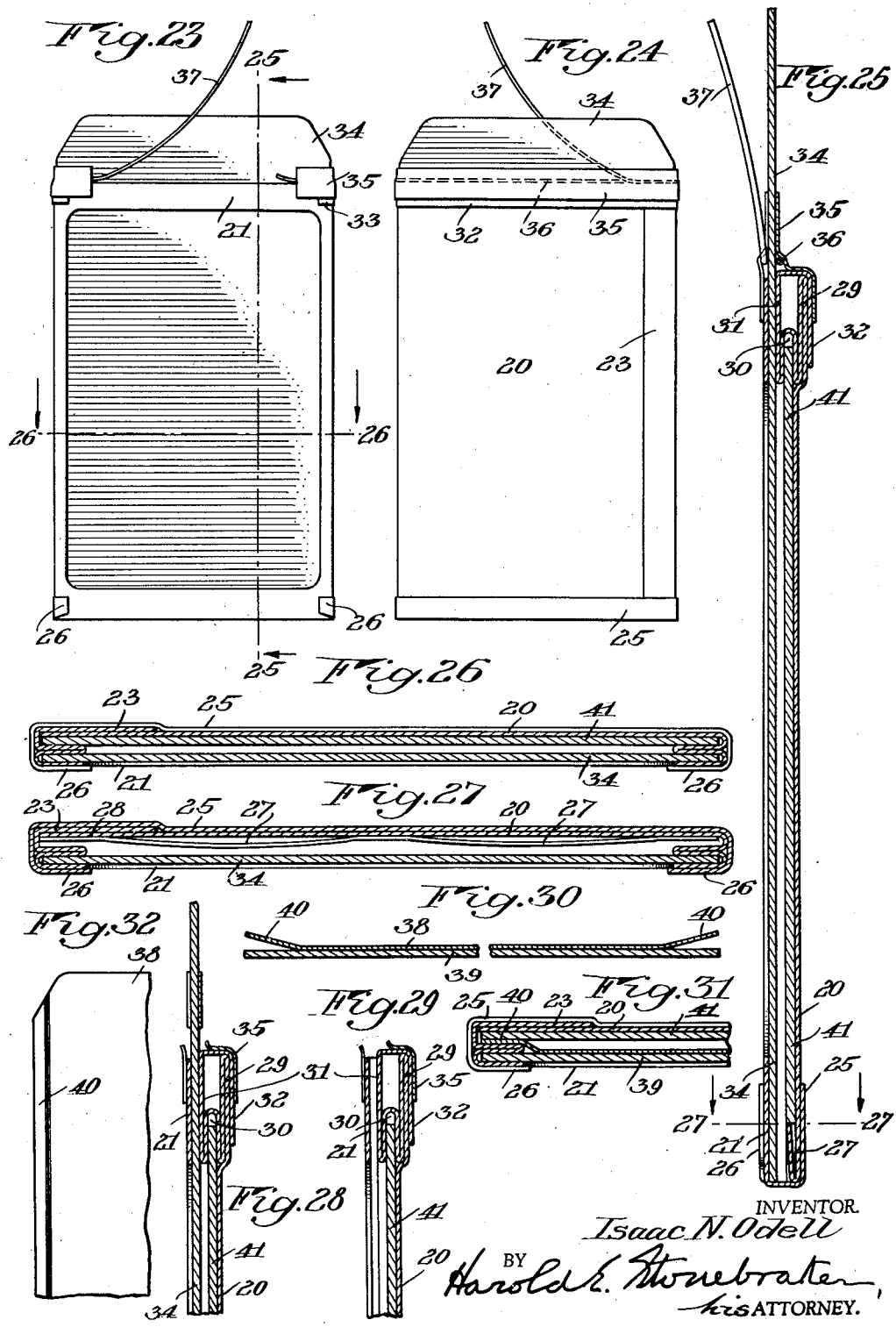

June 1, 1937.  I. N. ODELL  2,082,257

FILM HOLDER

Filed March 16, 1936  8 Sheets-Sheet 7

INVENTOR.
Isaac N. Odell
BY Harold E. Stonebraker,
his ATTORNEY.

June 1, 1937.　　　I. N. ODELL　　　2,082,257
FILM HOLDER
Filed March 16, 1936　　　8 Sheets-Sheet 8
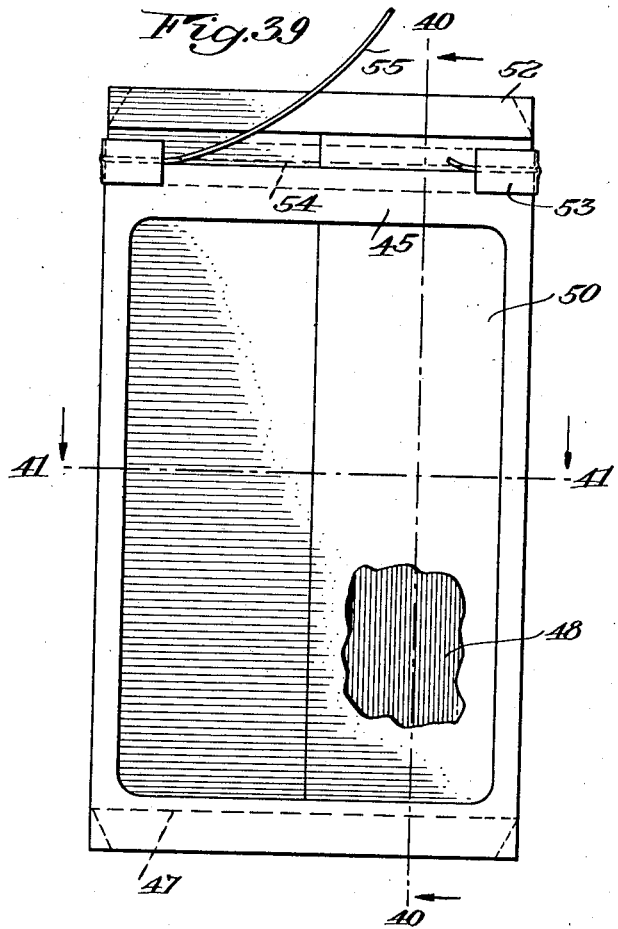
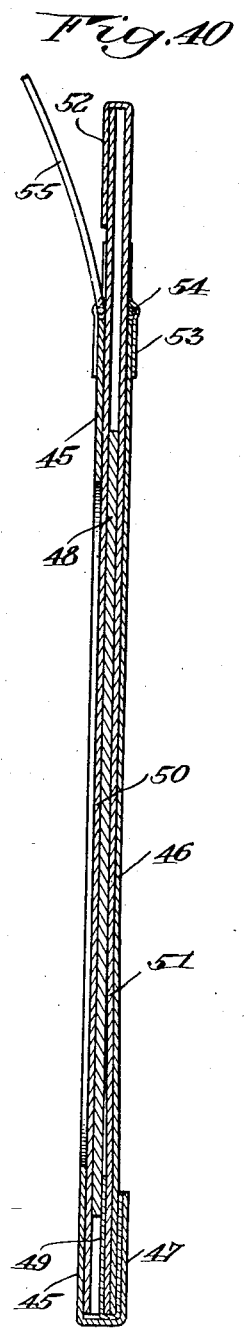
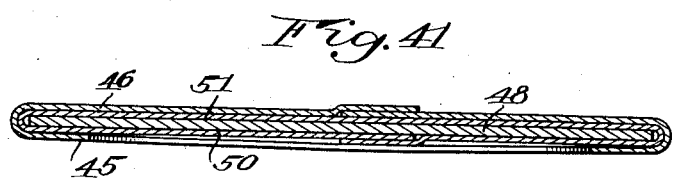
INVENTOR.
Isaac N. Odell
BY Harold E. Stonebraker,
his ATTORNEY.

Patented June 1, 1937

2,082,257

UNITED STATES PATENT OFFICE 2,082,257

FILM HOLDER

Isaac N. Odell, Rochester, N. Y., assignor to Defender Photo Supply Company, Incorporated, Rochester, N. Y., a corporation of New York Application March 16, 1936, Serial No. 69,148

20 Claims. (Cl. 95—66)

This invention relates to a film holder, and has for its object to afford a simple and practical construction for carrying a single sheet of flat film in an envelope of paper, cardboard, or other light weight material in light-tight relation to the envelope, and a light guard which may be in sealed relation to the envelope and is removable by breaking the seal or otherwise, after the holder is positioned in a camera, to permit exposure of the film.

A further object of the invention is to afford successful means enabling an operator readily to carry a large number of films of different character or sensitivity so that any type of film may be selected and inserted into a camera for a particular subject, and to accomplish this without the necessity of employing a heavy or bulky film holder, only a limited number of which may be carried at a time.

Another purpose of the invention is to provide an envelope of paper or suitable light weight material which contains a single cut film and successfully protects the latter from light until it is inserted in the camera and ready for exposure, when the operator can quickly and readily remove a light guard from the envelope, so that he may carry a large number of such film holders containing films of many different types and may select and insert into the camera at any time such film as will best serve the particular purpose, or subject to be photographed.

To these and other ends, the invention includes the structures and arrangements that will appear more clearly from the following description when read in conjunction with the accompanying drawings, the novel features being pointed out in the claims following the specification.

In the drawings:

Fig. 1 is a plan view of a blank from which the envelope may be formed according to one embodiment of the invention;

Fig. 2 is a similar view with parts broken away and showing the initial operation in forming the envelope;

Fig. 3 is a plan view illustrating the blank of Fig. 1 after the parts are partially folded and before sealing them together;

Fig. 4 is an end elevation with reference to Fig. 3 showing the manner of folding the blank;

Fig. 5 is a view similar to Fig. 3 after the parts are completely folded and sealed together;

Fig. 6 is an enlarged view similar to Fig. 5 with the light guard inserted;

Fig. 7 is a view similar to Fig. 6 with the sheet of film inserted and the envelope and light guard sealed, the latter being partially broken away to show the film;

Fig. 8 is a transverse sectional view on the line 8—8 of Fig. 7 looking in the direction indicated;

Fig. 9 is a transverse sectional view on the line 9—9 of Fig. 7 looking in the direction indicated;

Fig. 10 is a view similar to Fig. 7 looking at the back wall of the envelope;

Fig. 11 is a longitudinal sectional view on the line 11—11 of Fig. 10 looking in the direction indicated, and showing the parts after the film and light guard are inserted but before sealing the same;

Fig. 12 is a view similar to Fig. 11 showing the envelope and light guard sealed;

Fig. 13 is a partial sectional view similar to Fig. 12, showing the light guard seal broken and the latter partially removed from the envelope;

Fig. 14 is a plan view of a blank that may be employed in making the envelope according to a modified embodiment of the invention;

Fig. 15 is a view similar to Fig. 14 showing the initial operations in making the envelope with this form of blank;

Fig. 16 is a longitudinal sectional view on the line 16—16 of Fig. 15 looking in the direction indicated;

Fig. 17 is a plan view of the envelope after the blank shown in Fig. 15 is folded and sealed at one side;

Fig. 18 is a view similar to Fig. 17 showing the next step in forming the envelope;

Fig. 19 is a view similar to Fig. 18 with the light guard inserted;

Fig. 20 is a view similar to Fig. 19 after the light guard is sealed;

Fig. 21 is a longitudinal sectional view on the line 21—21 of Fig. 20 looking in the direction indicated;

Fig. 22 is a transverse sectional view on line 22—22 of Fig. 18 looking in the direction indicated.

Fig. 23 is a view similar to Fig. 20 after the film is inserted and the envelope sealed;

Fig. 24 is a view similar to Fig. 23 looking at the back wall of the envelope;

Fig. 25 is a longitudinal sectional view on the line 25—25 of Fig. 23 looking in the direction indicated;

Fig. 26 is a transverse sectional view on the line 26—26 of Fig. 23 looking in the direction indicated;

Fig. 27 is a transverse sectional view on the line 27—27 of Fig. 25 looking in the direction indicated;

Fig. 28 is a partial sectional view similar to Fig. 25 showing the light guard seal broken and the light guard partially removed;

Fig. 29 is a view similar to Fig. 28 showing the light guard entirely removed;

Fig. 30 is a sectional view showing a modified form of light guard;

Fig. 31 is a partial sectional view similar to Fig. 26 when employing the modified form of light guard shown in Fig. 30;

Fig. 32 is a partial plan view of the paper sheet constituting the supplemental light guard forming part of the modification shown in Fig. 30;

Fig. 39 is a plan view of the envelope and film shown in Fig. 37 after the light guard is inserted and sealed, the light guard being partially broken away to show the film;

Fig. 40 is a longitudinal sectional view on the line 40—40 of Fig. 39 looking in the direction indicated;

Fig. 41 is a transverse sectional view on the line 41—41 of Fig. 39 looking in the direction indicated;

Fig. 42 is a partial sectional view of a modification of the construction shown in Fig. 16;

Fig. 43 is a partial sectional view of another modification of the construction shown in Fig. 16, and Fig. 44 is a partial plan view showing a modified form of film positioning flap.

Figure 33:
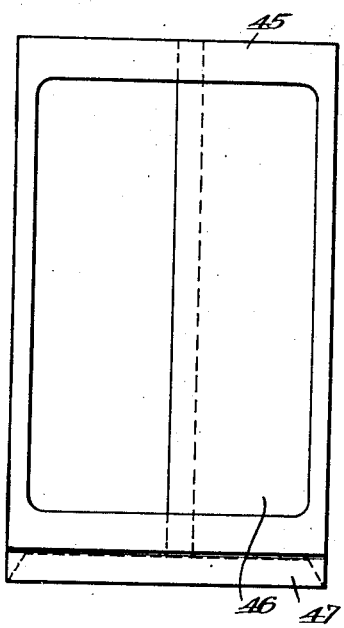
Fig. 33 is a plan view of another modified form of envelope.

The invention may be carried out in a variety of ways, and is illustrated in several possible embodiments embracing different forms of envelopes and light guard, with all of which it will be understood that after the envelope is formed, the film is inserted and the envelope sealed in a dark room, so that the film is maintained in light-tight relation to the envelope and light guard after removal from the dark room and up to the time when it is inserted in the camera for exposure, the light guard being suitably removed after the film holder is in the camera.

In all of the various embodiments, the envelope is made of paper, cardboard, or other suitable light weight material so that the operator can conveniently carry a large number of such film packages, and in the embodiment illustrated in Figs. 1 to 13, the blank from which the envelope is formed comprises three sections, namely, a back wall 1, an exposure wall 2 having an exposure opening therein, and a connecting or intermediate wall 3 that is also cut away similarly to the exposure wall. 4 is a flap at one end of the intermediate wall 3 that is covered with adhesive as indicated, 5 is a flap at the opposite end of the intermediate wall 3 that is provided with adhesive across only a portion of its width, as indicated, for a purpose that will appear presently, 6 and 7 are flaps along one side and one end of the exposure wall 2 having adhesive applied thereto on their rear faces, and 8 is a flap along one side of the back wall 1 covered with adhesive as indicated.

The initial operation of forming the envelope is shown in Fig. 2, and consists in folding up the flap 5 and securing it to the adjacent surface of the intermediate wall 3 by means of the adhesive illustrated, which leaves the edge and a portion of the flap 5 free from the intermediate wall and permits it to flex slightly away therefrom. Following this, the walls 1, 2 and 3 of the blank are folded upon one another, as shown in Figs. 3 and 4, and brought together as shown in Fig. 5, the flap 8 being adhesively secured over the adjacent portion of the exposure wall 2, and the flap 6 being adhesively secured to the adjacent surface of the back wall 1, while the bottom flap 7 is bent upwardly and adhesively secured to the adjacent surface of the back wall 1.

With the parts in the position illustrated in Fig. 5, the envelope is ready to receive the light guard and film. The light guard, designated at 10, preferably consists of heavy paper, light cardboard or other suitable material and is of a shape to slide into the envelope and fit the same closely. The light guard 10 is inserted as shown in Fig. 6, between the exposure wall 2 and the intermediate wall 3, being moved endwise into the envelope as far as it will go until stopped by the lower closed end of the envelope, and following this, the sheet of photographic film indicated at 11 is inserted between the intermediate wall 3 and the back wall 1, as shown in Fig. 11. After the film is inserted, the flap 4, shown in Figs. 1, 3, 5 and 11, is bent downwardly as shown in Fig. 12 and adhesively secured to the adjacent surface of the back wall 1, and the film is now completely sealed in the envelope in light-tight relation thereto and to the light guard 10.

The film when inserted in the envelope is moved downwardly until it contacts with the free edge of the flap 5, as shown in Figs. 11 and 12, and the flap 5 being free at its edge from the intermediate wall 3 and slightly flexed away therefrom, serves effectively as a stop for the film and, by engaging the adjacent edge thereof, limits and accurately positions the film in the envelope.

After the film is inserted and the envelope sealed as above described, the light guard is secured in fixed relation to the envelope by suitable means such as a sealing strip of paper or other suitable material indicated at 12 extending around and adhesively secured to portions of the light guard and of the envelope, as shown in Figs. 7, 10 and 12. It is desirable to provide convenient means for breaking the seal 12 after the film holder is positioned in a camera, and to accomplish this, a cord or suitable instrumentality, as indicated at 13, is secured beneath the sealing strip 12, and has a free end 14 that extends beyond the end of the sealing strip and can readily be engaged by the operator after the film holder is inserted in the camera. By pulling on the cord 13, the seal 12 is broken, as indicated in Fig. 13, and then by grasping the free end of the light guard 10, the latter is removed from the envelope and the film is ready to be exposed.

Figs. 14 to 32 disclose another embodiment of the invention, in which the envelope blank, illustrated in Figs. 14 and 15, consists of a back wall 20 and an exposure wall 21, having an exposure opening therein and connected with the back wall 20 by a bellows-like or corrugated portion 22. The exposure wall 21 has an adhesively coated flap 23 along one side, connected by a bellows-like or corrugated portion 24, and an adhesively coated flap 25 at one end with tabs 26 at its extremities. The back wall 20 has a flap 27 at one end coated with adhesive at the spaced points 28 for a purpose that will appear presently, an adhesively coated flap 29 at its other end, connected by a bellows-like or corrugated portion 30 to a portion 31, which in turn carries an adhesively coated flap 32 having tabs 33 at its extremities.

In forming the envelope of this construction, the flap 29 is first bent downwardly over the back wall 20 and adhesively secured thereto, and the portion 31 bent upwardly, as shown in Figs. 15 and 16. This places the bellows-like portion 30 in position, as shown in Fig. 16, to receive one end of the sheet of film, see Fig. 25, and it will be understood that the bellows-like or corrugated portions 22 and 24 at the sides of the exposure wall and connecting it with the back wall 20 when folded and secured, afford guideways for the sheet of film and the light guard, as will appear presently.

Figure 36:
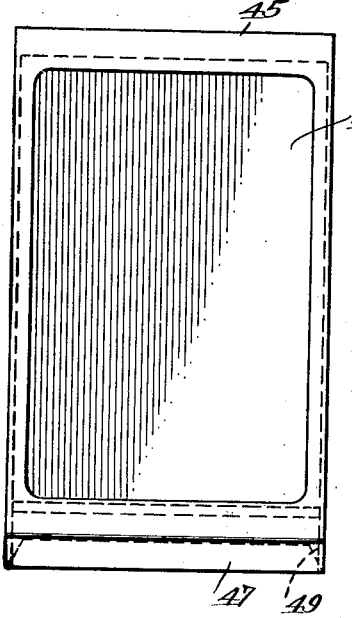
Fig. 36 is a plan view similar to Fig. 33 with the film inserted.
Figure 37:
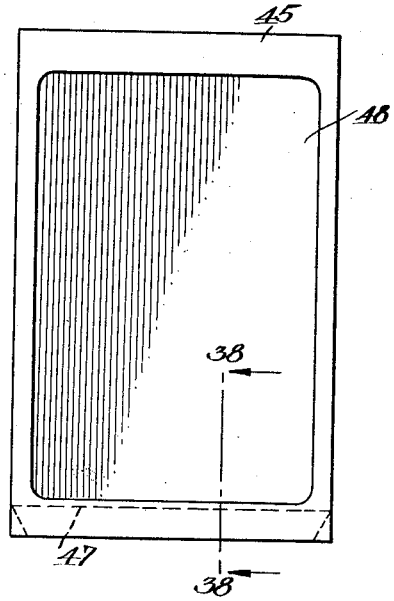
Fig. 37 is a view similar to Fig. 36 with the lower end of the envelope sealed and the film secured therein.

After the parts are folded as shown in Fig. 15, the exposure wall is bent over upon the back wall, the flap 23 is bent around and adhesively secured to the adjacent surface of the back wall, as shown in Fig. 17, and following this, the flap 32, see Figs. 16 and 17, is bent downwardly over the back wall 20 and adhesively secured thereto while the end tabs 33 are brought around over the exposure wall 21 and adhesively secured thereto, as shown in Fig 18. The envelope is then ready to receive the light guard 34 which is inserted between the exposure wall 21 and the portion 31, see Figs. 16, 19 and 21, after which the light guard 34 is fixed in its assembled relation to the envelope by the sealing strip 35 adhesively secured around the light guard and envelope and to surfaces of both, as shown in Figs. 20 and 21, 36 being a cord positioned under the sealing strip 35 and having a free end 37 extending beyond the seal and adapted to be engaged to break the latter to release the light guard when the same is to be removed.

With the parts in the position shown in Fig. 21, the envelope is ready to receive the sheet of cut film which is inserted through the lower end of the envelope and moved endwise therein until the edge of the film engages over the abutting edge of the flap 27, see Figs. 21 and 25. As the flap 27 is adhesively attached to the back wall only at the points 28, the main portion of the flap 27 flexes or springs away from the back wall, as shown in Fig. 27, affording ledges that engage the adjacent edge of the film and retain the latter in the envelope against accidental displacement after it is once inserted. Following the positioning of the film in the manner just described, the flap 25, see Fig. 21, is bent upwardly around the back wall 20 and adhesively secured thereto, as shown in Fig. 25, sealing the film effectively within the envelope in light-tight relation to the envelope and to the light guard.

In case it is desirable to protect the sheet of film additionally against light, a supplemental light guard such as illustrated in Figs. 30 to 32 inclusive may be employed. This comprises a sheet of paper or light cardboard designated at 38, the main body of which is adhesively or otherwise secured to the adjacent face of the light guard 39, the supplemental guard 38 affording free edge portions 40 which are unattached to the guard 39, and adapted to be spaced therefrom, as shown in Figs. 30 and 31. With this arrangement, when the light guard 39 is inserted into the envelope, its edges enter the guideways adapted to receive them, see Fig. 31, while the free edges 40 of the supplemental light guard 38 are inserted into the other guideways adapted to receive the film sheet 41, and when the film sheet is inserted, it is in contact with the free portions 40 of the supplemental light guard, thus affording means, supplemental to the main light guard 39, for preventing any possible leakage of light to the film from outside the envelope.

With the construction shown in Fig. 25, the operator, after selecting any film-containing envelope, inserts it into a camera, and then by pulling on the free end 37 of the cord 36, the seal around the light guard is broken, as illustrated in Fig. 28, permitting the operator to grasp the outer end of the light guard and withdraw it from the envelope, as shown in Fig. 29, thus uncovering the opening in the exposure wall in front of the film.

In some cases, it may be difficult to push the end of the film into the pocket formed by the corrugated portion 30, see Fig. 16, and in order to make this operation easy in the dark room, the envelope may be constructed as shown in Fig. 42 or Fig. 43. In Fig. 42, the portion 29 is of less length than portion 31, so that when the parts are folded, a shoulder 56 is afforded under the portion 31, and the film 41 can be moved endwise until it engages the shoulder 56. According to Fig. 43, the envelope is creased laterally to afford a rib 57, which engages and guides the film into the pocket 30.

Fig. 44 shows a modified form of flap for holding the film. Instead of having a flap extending entirely across the envelope, as shown at 27, Figs. 14 and 16, the flap may be cut away at its sides to afford a shortened flap 58 at the center of the envelope, see Fig. 44. This flap 58 is folded over on the body of the envelope after the film is inserted, and is secured to the film and envelope by a spot of adhesive 59 applied to the flap before folding it over on the film, and in this manner, the film is securely maintained in proper position in the envelope.

Figure 34:
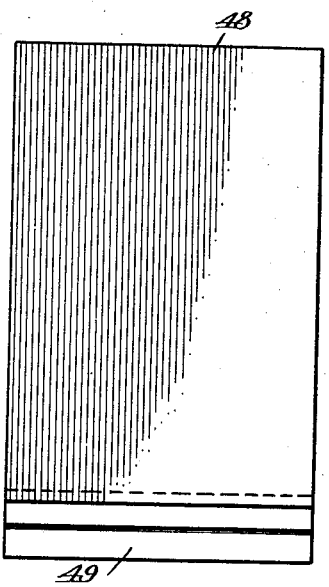
Fig. 34 is a plan view of a sheet of film used in conjunction with the envelope illustrated in Fig. 33.
Figure 38:
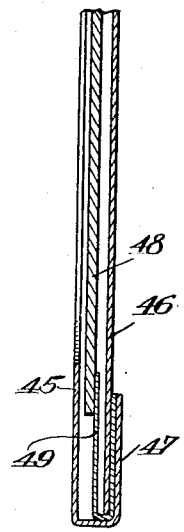
Fig. 38 is a partial longitudinal sectional view on line 38—38 of Fig. 37 looking in the direction indicated.

In Figs. 33 to 41, there is illustrated another modification of the invention, and according to this embodiment, the envelope includes an exposure wall 45 and a back wall 46, while 47 is a flap at the bottom of the exposure wall. 48 designates the sheet of film, see Fig. 34, to which is adhesively or otherwise attached at one end a portion or flap of paper or other suitable material 49. The sheet of film 48 is inserted into the envelope so as to bring the flap 49 in coincidence with the flap 47 of the exposure wall 45, and the flaps 47 and 49 are then bent around the back wall 46 and adhesively secured thereto, as shown in Fig. 38, thus holding the sheet of film securely within the envelope in proper position.

Figure 35:
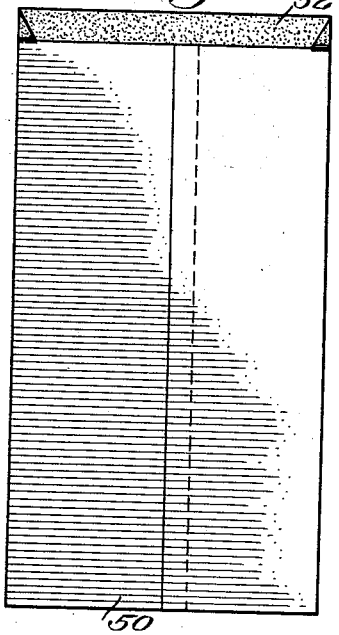
Fig. 35 is a plan view of the light guard employed with the envelope and film of Figs. 33 and 34.

With this arrangement, the light guard may comprise an envelope extending around both surfaces of the film sheet 48. The light guard, see Figs. 35 and 40, includes a portion or wall 50 located between the exposure wall 45 of the envelope and the film 48, and a second portion or wall 51 located between the film and the back wall 46. The light guard may be inserted after the film is located in the envelope by suitably positioning it around the sheet of film and sliding it endwise. The flap 52 on the light guard, see Fig. 35, is bent around and adhesively secured to the front wall 50 of the light guard, as shown in Fig. 40, thus closing the end of the light guard envelope and preventing access of light to the film. Following this, the seal 53 may be secured in place around the light guard and envelope with the breaking cord 54 and loose end 55, which may be pulled to break the seal and permit removal of the light guard, to permit exposure of the film similarly as in the structures already described.

While the invention has been disclosed in connection with certain details of construction, it is not confined to any one or all of the particular embodiments herein set forth, and this application is intended to cover any other modifications or departures from the specific forms herein shown that may come within the intent of the improvement or accomplish its purposes without departing from the essential features of the invention or the scope of the following claims.

I claim:

1. A film package comprising an envelope formed of light weight material including an exposure wall and a back wall, a light guard separate and removable from the envelope, and a sheet of photographic film located in light-tight relation to the envelope and light guard and fixed against endwise movement.

2. A film package comprising an envelope formed of light weight material including an exposure wall and a back wall, a light guard separate and removable from the envelope, a sheet of photographic film located in light-tight relation to the envelope and light guard, and fixed against endwise movement, and sealing means maintaining the light guard in fixed relation to the envelope and adapted to be broken to permit removal of the light guard.

3. A film package comprising an envelope formed of light weight material and including an exposure wall and a back wall, of a light guard separate from and slidably removable from the envelope and located adjacent to said exposure wall, a sheet of photographic film located between said light guard and said back wall in light-tight relation to the guard and envelope and fixed against endwise movement, and sealing means maintaining the light guard in fixed relation to the envelope and adapted to be broken to permit its removal therefrom.

4. A film package comprising an envelope formed of light weight material and including an exposure wall and a back wall, of a light guard located adjacent to the exposure wall and slidably removable from the envelope, and a sheet of photographic film located between said light guard and said back wall of the envelope and secured in light-tight relation to the envelope and light guard, the film being fixed against endwise movement.

5. A film package comprising an envelope formed of light weight material and including an exposure wall and a back wall, of a light guard located adjacent to the exposure wall and slidably removable from the envelope, a sheet of photographic film located between said light guard and said back wall of the envelope and secured in light-tight relation to the envelope and light guard and fixed against endwise movement, and sealing means connecting the envelope and light guard to hold them in fixed relation and adapted to be broken to permit removal of the light guard.

6. The combination with an envelope formed of light weight material and including an exposure wall and a back wall, of a light guard located adjacent to the exposure wall and slidably removable from the envelope, a sheet of photographic film located between said light guard and said back wall of the envelope and secured in light-tight relation to the envelope and light guard, sealing means connecting the envelope and light guard to hold them in fixed relation, and means associated with said sealing means for breaking the seal between the envelope and light guard to permit removal of the latter.

7. A film package comprising an envelope formed of light weight material and including an exposure wall and a back wall, of a light guard, separate and removable from the envelope and a sheet of photographic film located between said light guard and said back wall of the envelope and secured in light-tight relation to the envelope and light guard, the film being fixed against endwise movement and the light guard being removable from the envelope to permit exposure of the film.

8. A film package comprising an envelope formed of light weight material and including an exposure wall and a back wall, of a sheet of photographic film located within the envelope and fixed against endwise movement therein, a light guard having a portion located between the film and said exposure wall, the film being in light-tight relation to the envelope and light guard and sealing means maintaining the light guard in fixed relation to the envelope and adapted to be broken to permit removal of the light guard.

9. The combination with an envelope formed of light weight material and including an exposure wall and a back wall, of a sheet of photographic film located in the envelope, a light guard having a portion located between said film and the exposure wall, sealing means maintaining the light guard in fixed relation to the envelope, and means associated with said sealing means and accessible when the envelope is positioned in a camera for breaking said sealing means and permitting removal of the light guard.

10. A film package comprising an envelope formed of light weight material and including an exposure and a back wall, of a sheet of photographic film located in the envelope, and fixed against endwise movement therein and a light guard located between the film and the exposure wall, the film being secured in light-tight relation to the envelope and light guard, and the light guard being removable to expose the film.

11. A film package comprising an envelope formed of light weight material and including an exposure and a back wall, a sheet of photographic film located in the envelope and fixed against endwise movement therein, a light guard having a portion located between the film and said exposure wall, the film being secured in light-tight relation to the envelope and light guard, and sealing means maintaining the light guard in fixed relation to the envelope and adapted to be broken to permit removal of the light guard.

12. The combination with an envelope formed of light weight material and including an exposure wall, a sheet of photographic film located in the envelope, a light guard having a portion located between the film and said exposure wall, the film being secured in light-tight relation to the envelope and light guard, sealing means maintaining the light guard in fixed relation to the envelope and adapted to be broken to permit removal of the light guard, and means associated with the sealing means and accessible when the envelope is positioned in a camera to break said sealing means and permit removal of the light guard.

13. The combination with a one-piece envelope formed of light weight material and including an exposure wall, an intermediate wall, and a back wall, of a light guard located between the exposure wall and said intermediate wall, a sheet of photographic film located between said intermediate wall and said back wall in light-tight relation to the envelope and light guard, and sealing means maintaining the light guard in fixed relation to the envelope and adapted to be broken to permit removal of the light guard.

14. The combination with a one-piece envelope formed of light weight material and including an exposure wall, an intermediate wall and a back wall, of a light guard located between the exposure wall and said intermediate wall, a sheet of photographic film located between said intermediate wall and said back wall in light-tight relation to the envelope and light guard, and sealing means maintaining the light guard in fixed relation to the envelope and adapted to be broken to permit removal of the light guard, said intermediate wall having a portion bent upon itself affording a shoulder engageable with one end of the sheet of film to position it in the envelope.

15. The combination with a one-piece envelope formed of light weight material and including an exposure wall and a back wall connected by portions affording guideways for a sheet of photographic film and a light guard, a light guard located in the envelope adjacent to said exposure wall, a sheet of photographic film located between the light guard and the back wall and secured in light-tight relation to the envelope and light guard, and sealing means maintaining the light guard in fixed relation to the envelope and adapted to be broken to permit removal of the light guard.

16. The combination with a one-piece envelope formed of light weight material and including an exposure wall and a back wall connected by portions affording guideways for a sheet of photographic film and a light guard, a light guard located in the envelope adjacent to said exposure wall, a sheet of photographic film located between the light guard and the back wall and secured in light-tight relation to the envelope and light guard, and sealing means maintaining the light guard in fixed relation to the envelope and adapted to be broken to permit removal of the light guard, said back wall having a portion bent upon itself with its free edge slightly spaced from the back wall affording a shoulder engageable with one edge of the film to maintain the latter in predetermined position in the envelope.

17. The combination with a one-piece envelope formed of light weight material and including an exposure wall and a back wall connected by portions affording guideways for a sheet of photographic film and a light guard, a light guard located in the envelope adjacent to said exposure wall, a sheet of photographic film located between the light guard and the back wall and secured in light-tight relation to the envelope and light guard, sealing means maintaining the light guard in fixed relation to the envelope and adapted to be broken to permit removal of the light guard, and a supplemental light guard secured to the first mentioned light guard and having free edges extending into the guideway containing the sheet of film and located against the adjacent edges of the latter.

18. The combination with an envelope formed of light weight material and including an exposure wall and a back wall, of a sheet of photographic film located in the envelope and having a piece of material such as paper secured to one end thereof and permanently attached to the adjacent end of the envelope, a light guard having portions located on opposite sides of said film with its outer ends sealed together to maintain the film in light-tight relation thereto, and sealing means maintaining the light guard in fixed relation to the envelope and adapted to be broken to permit its removal therefrom.

19. The combination with an envelope formed of light weight material of a light guard removable from the envelope, a sheet of film located in the envelope in light-tight relation to the guard and envelope, and a flap carried by a wall of the envelope and having a free edge slightly spaced therefrom affording a shoulder which engages an edge of the film and positions the same.

20. A film package comprising an envelope formed of light weight material and including an exposure wall and a back wall, a sheet of photographic film located in the envelope and permanently attached to one end thereof to hold the film against movement endwise of the envelope, a light guard slidably removable from the envelope and having portions located on opposite sides of the film with its outer ends and sides connected to maintain the film in light-tight relation thereto, and sealing means maintaining the light guard in fixed relation to the envelope and adapted to be broken to permit its removal therefrom.

ISAAC N. ODELL.